United States Patent [19]

Raidel

[11] 4,445,707

[45] May 1, 1984

[54] SUSPENSION SYSTEM WITH PARALLELOGRAM AXLE STABILIZATION AND CENTRAL ELASTOMER SPRING

[76] Inventor: John E. Raidel, Rte. 1, Box 400-M, Springfield, Mo. 65804

[21] Appl. No.: 341,565

[22] Filed: Jan. 21, 1982

[51] Int. Cl.³ .................. B60G 5/00; B60G 11/26; B10K 23/00
[52] U.S. Cl. .................................. 280/687; 280/711
[58] Field of Search .................. 280/711, 287, 687; 101/467, 470; 428/341, 913, 914

[56] References Cited

U.S. PATENT DOCUMENTS

| | | | |
|---|---|---|---|
| 3,768,821 | 10/1973 | Hickman | 280/687 |
| 3,857,580 | 10/1974 | Keijzer, et al. | 280/711 |
| 4,132,432 | 1/1979 | Raidel | 280/711 |
| 4,153,266 | 5/1979 | Uhis | 280/711 |
| 4,181,323 | 1/1980 | Raidel | 280/711 |
| 4,278,271 | 7/1981 | Raidel | 280/687 |

Primary Examiner—Richard A. Bertsch
Attorney, Agent, or Firm—Rogers, Eilers, & Howell

[57] ABSTRACT

A first embodiment of a suspension supports a vehicle from a drive axle and includes a forward hanger and a rearward hanger depending downwardly from the chassis, an axle seat assembly attaching the suspension to the axle, a first torque arm pivotally connected between the axle seat assembly and the forward hanger, a second torque arm pivotally connected between the axle seat assembly and the rear hanger, a central elastomer spring mounted between opposing surfaces of the torque arms, and an upper radius rod pivotally connected and extending between the forward hanger and axle seat assembly to form a parallelogram with the first torque arm to control and stabilize the axle. A second embodiment of the same suspension mounts a vehicle chassis to a steer axle with the radius rod being offset inwardly and the axle seat being mounted to the top of the steer axle to accommodate space limitations.

24 Claims, 10 Drawing Figures

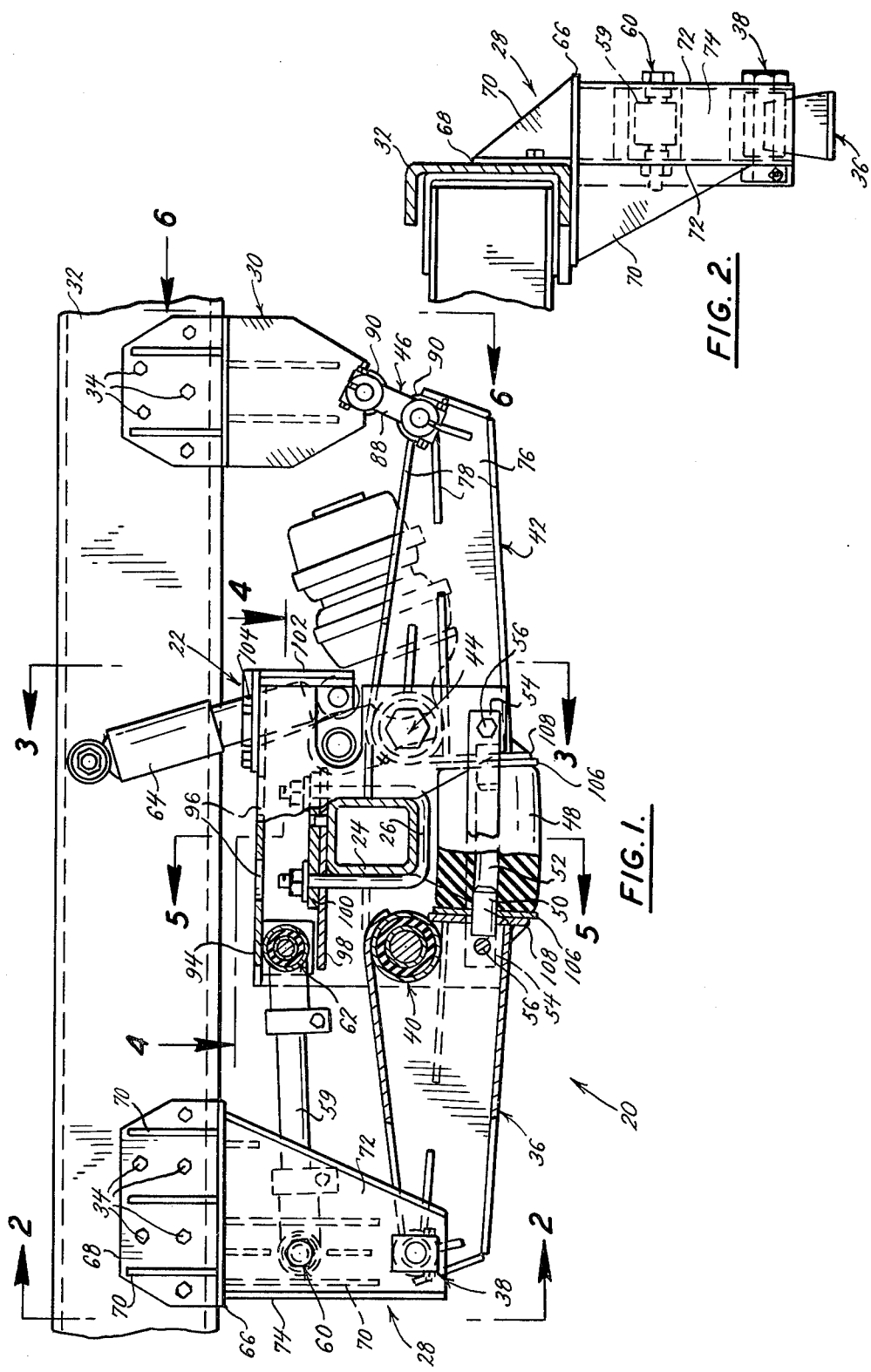

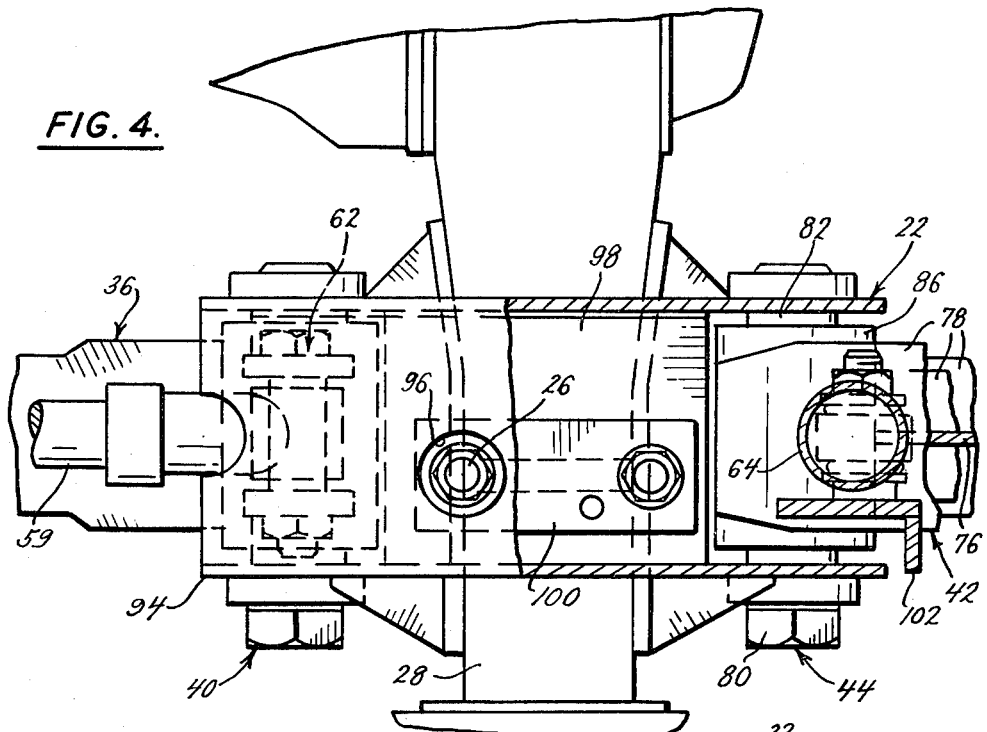
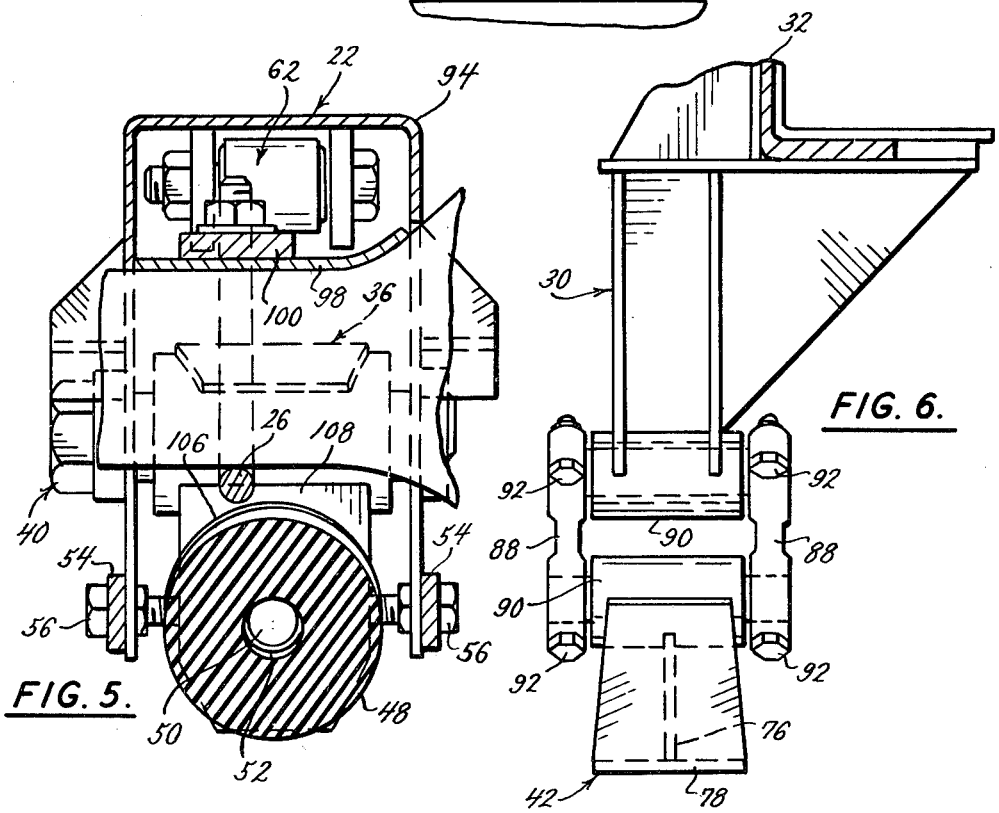

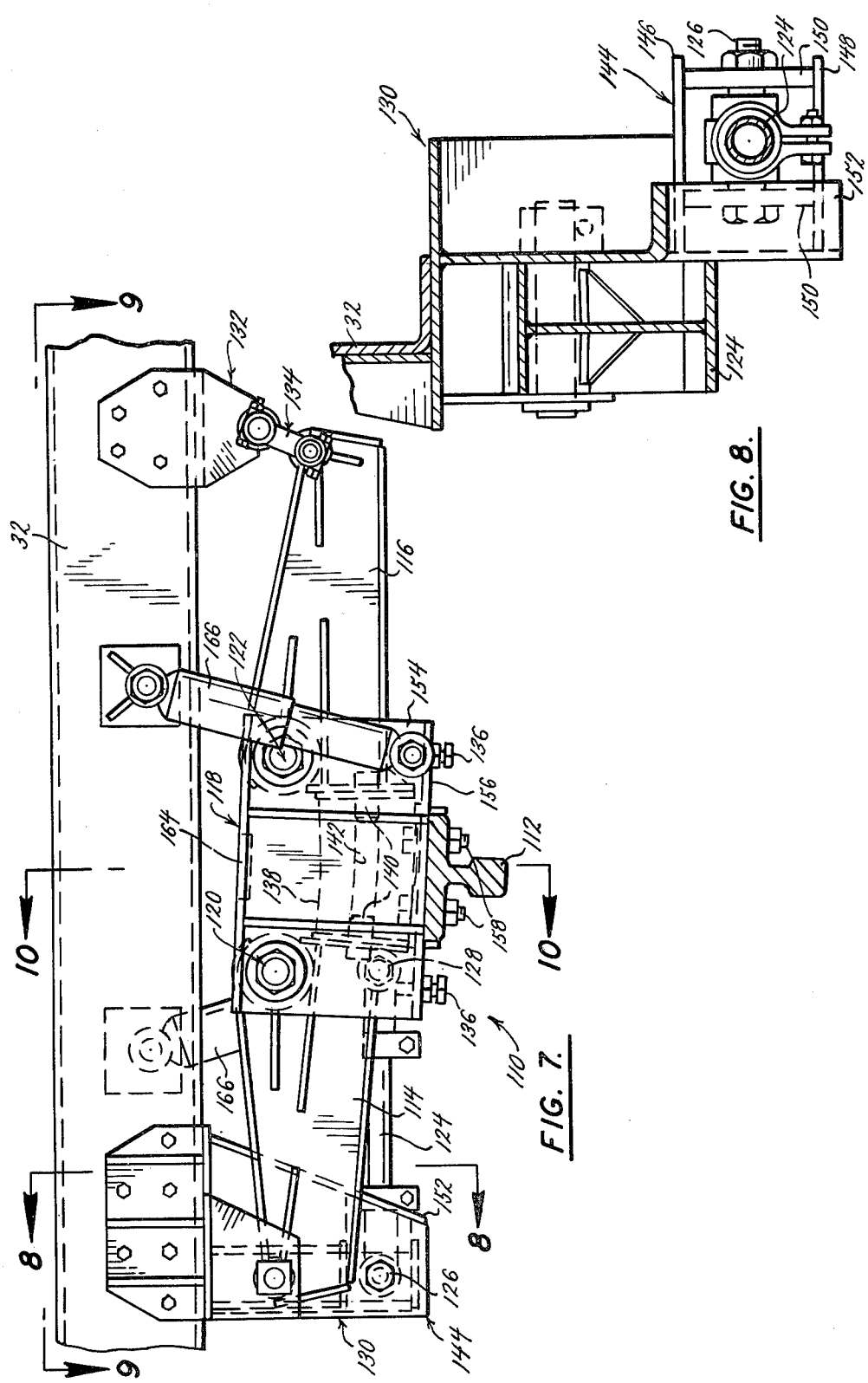

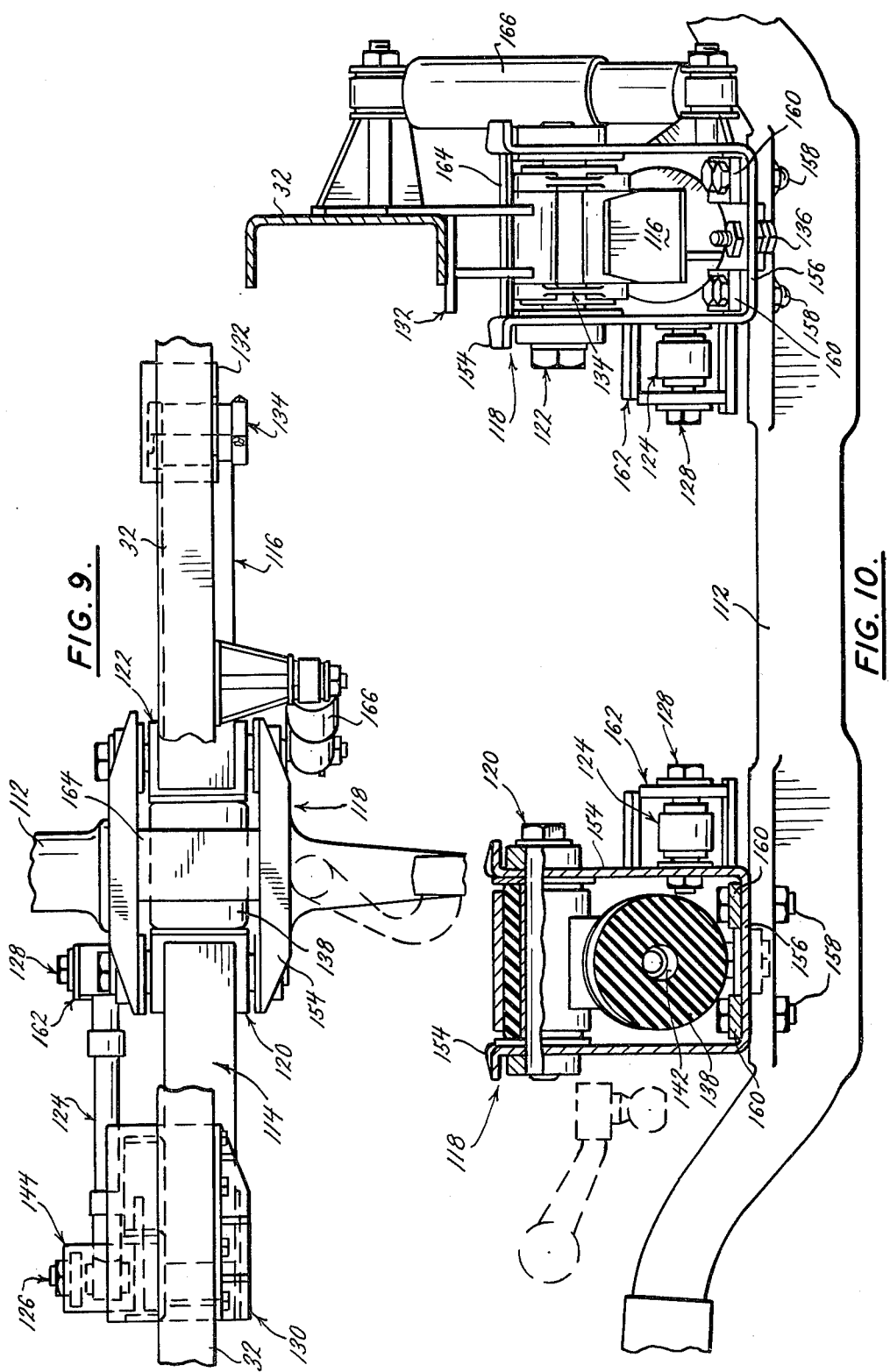

SUSPENSION SYSTEM WITH PARALLELOGRAM AXLE STABILIZATION AND CENTRAL ELASTOMER SPRING

BACKGROUND AND SUMMARY

In a suspension system for a truck or other heavy duty vehicle, it is important to control the pitch of the axle as the axle oscillates with respect to the chassis. For the drive axle, it is important to maintain alignment of the drive train as the axle oscillates and to maintain the wheels in contact with the ground under all conditions. Similarly, with a steer axle, it is important to maintain the axle in alignment to ensure proper steering response and to also control the axle during oscillation, braking, and acceleration so that the operator has full control of the vehicle under all conditions.

Applicant has previously invented and patented suspensions which utilize a parallelogram structure for controlling and stablizing the axle. Some of these include U.S. Pat. No. 4,114,926; U.S. Pat. No. 4,132,432; and U.S. Pat. No. 4,181,323; the disclosures of which are incorporated herein by reference. These patents disclose air spring suspensions utilizing parallelogram structures of various types to stabilize the axle under all conditions of oscillation, braking, and acceleration. This arrangement offers many advantages over suspensions of the prior art, such as eliminating wheel hop and axle windup during emergency braking, as explained more completely therein. While these inventions are limited only by the scope of the claims, the preferred embodiments disclose suspensions for both drive axles and steer axles stabilized by a parallelogram.

Applicant has also designed and developed a suspension system for a tandem axle which incorporates a central elastomer spring disposed between two pivotally mounted torque arms such that loading of the vehicle pivots the torque arms and compresses the central elastomer spring. This invention is disclosed and claimed in U.S. Pat. No. 4,278,271, the disclosure of which is incorporated herein by reference. As explained more fully therein, the central elastomer spring provides a smooth ride and, at the same time, has sufficient resiliency to support substantial loads. Additionally, a major advantage of the central elastomer spring is that it may be easily removed and replaced, and is a less complicated structure requiring fewer parts and therefore is less expensive to manufacture and maintain. Another feature of the central elastomer spring suspension is that the load capacity of the suspension may be changed by simply removing the elastomer and replacing it with another having greater or less resiliency, as desired. Although the invention as disclosed in applicant's prior U.S. Pat. No. 4,278,271 is limited only by the scope of the claims, the preferred embodiment shown therein is a suspension adapted for use with a tandem axle vehicle such as a trailer with a non-powered, non-steerable axle/chassis arrangement.

In the suspension of the present invention, applicant has succeeded in combining the many advantages of parallelogram stabilization with the advantages of a suspension having a central elastomer spring for use with a drive axle and a steer axle. The first embodiment, which is adapted for use with a drive axle, has a first hanger assembly mounted at the forward end of the suspension, a second hanger assembly mounted at the rearward end of the suspension, a generally U-shaped axle seat mounted over the axle in an inverted orientation, and first and second torque arms pivotally mounted to and extending between the axle seat assembly and one of the hangers. A radius rod pivotally mounted to and extending between the forward hanger and the axle seat assembly along with the forward torque arm completes the parallelogram. The central elastomer spring is disposed beneath the axle and held in place between the torque arms by dowel pins extending into an axial hole in the spring, so that loading of the vehicle pivots the torque arms and compresses the spring. Tension rails bolt to and extend between the legs of the U-shaped axle bracket to prevent them from opening up under load. A shackle assembly pivotally mounts the rear torque arm to the rear hanger assembly to permit free vertical movement of the axle as controlled by the parallelogram. The bolts fastening the tension rods to the axle seat assembly extend inwardly sufficiently to contact each torque arm as it pivots away from the central spring to limit its movement and prevent inadvertent release of the central spring. Removal of these bolts and separation of the axle from the chassis releases the spring such that it can be lifted out by hand. One or more shock absorbers extend between the chassis and axle seat assembly to dampen axle movement.

A second embodiment is adapted for use with a steer axle and includes many of the same component parts as is used in the first embodiment for the drive axle. This adds to the versatility of applicant's invention by minimizing inventory required to manufacture and maintain both suspensions. In the second embodiment, a different axle seat assembly bolts to the top of the steering axle, with the same torque arms pivotally secured to and extending between front and rear hanger assemblies, as in the first embodiment. However, the central elastomer spring is disposed immediately above the steering axle, and set screws extend upwardly through the bottom of the axle seat assembly to limit torque arm movement and prevent release of the spring. The same radius rod is positioned inwardly of the forward torque arm to avoid interference with controls for the steering arm and also meet the reduced space limitations inherent in a steering axle suspension. Other components used are exactly the same as in the first embodiment.

In both embodiments, the central spring may be easily removed by loosening the bolts or set screws, as appropriate, elevating the vehicle to separate the axle from the chassis which also pivots apart the torque arms, and lifting the spring from between the torque arms and dowel pins. The spring may then be replaced and the suspension placed back in working condition by reversing the above procedure.

The above are just some of the features and advantages of applicant's suspension. A more complete understanding of these and other advantages may be obtained by referring to the description of the preferred embodiment and drawings.

BRIEF DESCRIPTION OF THE DRAWINGS

FIG. 1 is a side view of the first embodiment showing the suspension adapted for use with a drive axle;

FIG. 2 is a front view of the suspension of FIG. 1 taken along the plane of line 2—2 in FIG. 1;

FIG. 4 is a top view of the axle seat of the first embodiment taken along the plane of line 4—4 in FIG. 1 and in partial cross-section to detail torque arm and axle mounting;

Figure 3:
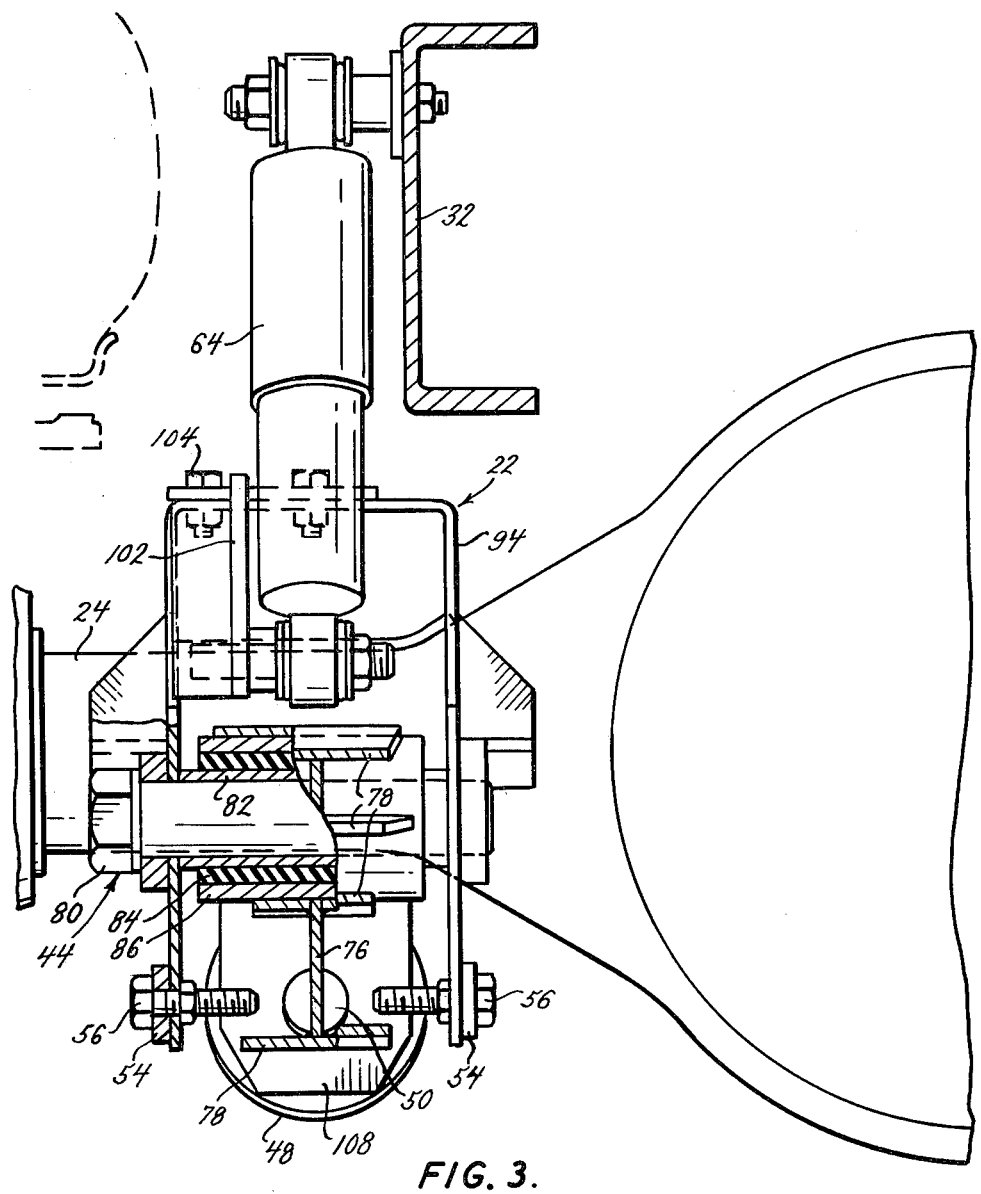
FIG. 3 is a cross-sectional view of the first embodiment taken along the plane of line 3—3 in FIG. 1 and detailing the axle seat and torque arm pivot point.

FIG. 5 is a cross-sectional view of the axle seat and axle taken along the plane of line 5—5 in FIG. 1;

FIG. 6 is a rear view of the first embodiment taken along the plane of line 6—6 in FIG. 1 and further detailing the shackle assembly at the rear of the suspension;

FIG. 7 is a side view of the second embodiment of applicant's suspension as used for a steer axle;

FIG. 8 is a cross-sectional view of the forward hanger and inwardly offset radius rod taken along the plane of line 8—8 in FIG. 7;

FIG. 9 is a top view of the second embodiment taken along the plane of line 9—9 in FIG. 7; and FIG. 10 is a cross-sectional view of the axle seat and axle and a rear view of the suspension mounted at the opposite side of the vehicle taken along the plane of line 10—10 in FIG. 7.

DETAILED DESCRIPTION OF THE PREFERRED EMBODIMENTS

Applicant's first embodiment 20 is shown in FIGS. 1-6 and will first be described generally as an aid in understanding the invention. Referring to FIG. 1, the suspension 20 generally includes a U-shaped axle seat assembly 22 which is inverted and mounted over a drive axle 24 with U-bolt 26. A forward hanger assembly 28 and rearward hanger assembly 30 are bolted to the chassis 32 by bolts 34 and depend downwardly therefrom, as shown. A first torque arm 36 is pivotally connected to the forward hanger assembly 28 by bushing 38 and to the axle seat assembly 22 by bushing assembly 40. Similarly, a second torque arm 42 is pivotally mounted to axle seat assembly 22 by bushing 44 at its forward end and pivotally mounted to the rear hanger 30 by shackle assembly 46. A central elastomer spring 48 is disposed between torque arms 36, 42 and is held in place by dowel pins 50 mounted to torque arms 36, 42 and aligned with a generally cylindrical axial hole 52 through spring 48. A pair of tension rails 54 are bolted to the opposing legs of the U-shaped axle seat assembly 22 by bolts 56 to prevent separation of the axle seat assembly 22 under load. As best shown in FIG. 3, bolts 56 extend inwardly sufficiently far to contact the torque arms 36, 42 as they pivot away from central spring 48 to prevent its release as the axle 24 oscillates with respect to the chassis 32. An upper radius rod 58 is pivotally connected to forward hanger 28 by bushing 60 and to axle seat assembly 22 by bushing assembly 62. One or more shock absorbers 64 may be mounted at any convenient place in the suspension such as between the axle seat assembly 22 and chassis 32, as shown.

The forward hanger assembly 28 is shown in greater detail in FIG. 2 and includes a base plate 66 and a mounting plate 68 with reinforcing webs 70 extending therebetween. The lower portion of the hanger 28 includes two side plates 72 between which are mounted bushing assemblies 38, 60 for the first torque arm 36 and upper radius rod 58, respectively. An end plate 74 extends between side plates 72 and encloses the space therebetween. Other reinforcing webs 70 are also included, as desired, to further strengthen the hanger assembly 28.

The second torque arm 42 is typical of both torque arms and is shown in greater detail in FIG. 3. Torque arm 42 includes a central web 76 with cross members 78 along the edges and at several places therebetween to strengthen same. Thus, the torque arm 42 takes the general shape of an I-beam with intermediate cross members 78 further strengthening same at the pivot points.

The bushing assembly 44 is also shown in cross-sectional detail in FIG. 3 and includes a central bolt 80 with an inner sleeve 82, a rubber or elastomeric member 84 and an outer sleeve 86. Bushing assembly 44 mounts second torque arm 42 by being welded to the outer sleeve 86, as shown. The first or forward torque arm 46 is similarly mounted by bushing assembly 40, bushing assembly 40 being constructed identically to bushing assembly 44.

Shackle assembly 46 is best shown in FIG. 6 and is simply constructed of a pair of pivot arms 88 rotatably attached to bushing assemblies 90 at the end of second torque arm 42 and at the bottom of rearward hanger assembly 30. Either self lubricating fiber bushing assemblies may be used, or bronze bushings with lubrication fittings 92 as shown.

The U-shaped axle seat assembly 22 is best shown in FIGS. 3, 4, and 5 and generally includes a U-shaped bracket 94 which is also U-shaped in cross-section. As shown in FIG. 4, a pair of openings 96 are formed in the top of bracket 94 for access to the U-bolt 26 which secures axle seat assembly 22 to drive axle 24. A cross bracket member 98 is welded to and extends between the sides of U-shaped bracket 94. U-bolt 26 surrounds axle 24 and mounts to bracket member 98 to secure axle seat assembly 22 thereto. A second bracket 100 mounts between the legs of U-bolt 26 and atop cross bracket 98 to further strengthen and secure the mounting of the axle seat assembly 22.

A central elastomer spring 48 is formed into a generally cylindrical shape and extends between spring surface pads 106 mounted to spring platforms 108 formed in each of the torque arms 36, 42, as is best shown in FIG. 1. As explained above, dowel pins 50 are mounted to and extend out of pads 106 and platforms 108 to be received by the cylindrical hole 52 which extends along the center axis of spring member 48. Thus, the central elastomer spring 48 is captured between torque arms 36, 42 by dowel pins 50. Also as explained above, the shanks of bolts 56 which mount tension rails 54 extend sufficiently inward to contact the spring platform 108 and limit the pivoting movement of torque arms 36, 42 to prevent unintended release of the spring.

Other suspension components are shown in the drawings, and it is believed that a detailed description thereof is not required as they have been previously explained in applicant's prior patents as mentioned above, and are also well known in the art.

One or more shock absorbers 64 may be mounted at any convenient position along the suspension 20. As an example thereof, applicant has depicted a typical mounting position built into the axle seat assembly 22, as best shown in FIG. 3. A mounting bracket 102 is bolted to the top of axle seat 22 by bolt 104 which provides a convenient mounting position for the lower end of shock absorber 64. The upper end thereof is conveniently mounted to chassis member 32, as shown.

Applicant's second embodiment 110 of the suspension as adapted for use with a steer axle 112 is shown in FIGS. 7-10 and includes many of the same components as in applicant's first embodiment 20. For example, torque arms 114, 116 are exactly the same as torque arms 36, 42 of the first embodiment. Although the axle seat assembly 118 is slightly different, torque arms 114, 116 are secured to axle seat assembly 118 by bushings 120, 122 which are exactly the same as bushings 40, 44 of the first embodiment. The radius rod 124 is exactly the same component and is secured by bushings 126, 128 which are the same as bushings 60, 62. However, in applicant's second embodiment 110 the radius rod 124 is positioned below the first torque arm 114 and is offset inwardly therefrom as is best shown in FIGS. 8 and 9. For this purpose, the forward hanger 130 is slightly different and will be explained. The rear of second torque arm 116 is secured to the rear hanger 132 by shackle assembly 134 which directly corresponds to the first embodiment. Because of the different shape and orientation of the axle seat assembly 118, there are no tension rails 54 and bolts 56 to limit the pivoting movement of torque arms 114, 116. Accordingly, set screws 136 are mounted through the bottom of axle seat assembly 118 and extend upwardly therein to perform the same function. The central elastomer spring 138, including dowel pins 140 and cylindrical hole 142 are exactly as shown in applicant's first embodiment 20. However, it is noted that the arrangement of the torque arms 114, 116 with bushings 120, 122 at the top of axle seat assembly 118 permit positioning of the central elastomer spring 138 above the steer axle 112 while in applicant's first embodiment 20 the central elastomer spring 48 is positioned below drive axle 24. These differences will now be explained in more detail.

As best shown in FIG. 8, the forward hanger assembly 130 has an offset inward bracket extension 144 comprising an upper bracket member 146, lower bracket member 148 and vertical mounting brackets 150 extending therebetween. A side bracket 152 partially encloses the bracket extension 144, as shown. This provides an inboard mounting position for radius rod 124 such that the pivoting movement of torque arm 114 is not restricted thereby.

Axle seat assembly 118 is best shown in FIGS. 7 and 10 and generally includes a U-shaped bracket 154 with its base 156 mounted to steer axle 112 by bolts 158 and cross brackets 160. An offset bracket extension 162, similar to offset bracket extension 144 is welded to the inboard side of U-shaped bracket 154 and provides the pivotal mount for the rear end of radius rod 124. As best shown in FIG. 9, a cross bracket member 164 joins the upper legs of the U-shaped bracket 154 to strengthen same. As shown in the right hand side of FIG. 10, set screw 136 is mounted to the base 156 of U-shaped bracket 154 and extends upwardly between cross brackets 160 to contact torque arm 116 as it pivots away from the central elastomer spring 138 and prevent its release. As shown in FIGS. 7, 9, and 10, one or more shock absorbers 166 may be conveniently mounted to axle seat assembly 118 and extend therefrom to chassis member 168.

Operation

As can be seen from both embodiments, the forward torque arm and radius rod form a parallelogram to control the axle movement and maintain its pitch as it moves up and down with respect to the chassis in response to vehicle loading, and operation over uneven surfaces. This is important in a drive axle to maintain drive line alignment during vehicle operation. Similarly, it is important in a steer axle to prevent forces generated through braking and uneven road surfaces on the steering axle from taking control of the vehicle away from the operator, especially under emergency conditions requiring maximum braking and/or turning. For example, when the brakes are applied the axle wants to turn with the wheel which, if permitted to do so, would push the drag link and turn the wheel. Parallelogram control, by maintaining the pitch of the axle constant, prevents this from happening.

The suspension resists loading through compression of the central elastomer spring. This can best be understood by referring to FIG. 1 and/or FIG. 7 and remembering that loading of the vehicle is equivalent to upward movement of the axle with respect to the chassis. As shown in FIG. 1, upper movement of the drive axle causes the front and rear torque arms to pivot about the bushings mounting same to the axle seat, thereby compressing the central elastomer spring. The shackle assembly at the rear of the second torque arm permits vertical movement of the axle as controlled by the parallelogram formed by the radius rod and first torque arm. The tension rails join the legs of the U-shaped axle seat assembly to strengthen it and prevent its deformation during vehicle operation. As can be appreciated, substantial forces are generated about the bushings mounting the torque arms to the axle seat assembly. The tension rails ensure reliable operation. When it is desired to remove the central elastomer spring, the tension rails and bolts mounting same to the axle seat assembly are removed, and the chassis elevated with respect to the axle (such as by jacking of the vehicle) which pivots the torque arms away from each other and removes the dowel pins from the cylindrical axial hole of the central spring. The central spring will then drop out and can be easily replaced by reversing the process.

The operation of applicant's second embodiment is very similar to that of the first embodiment. The forward torque arm and radius rod provide parallelogram controlled movement of the steer axle with respect to the chassis and the shackle assembly mounting the rear torque arm to the rear hanger accommodates the substantially vertical movement thereof to maintain its pitch during operation. Removal of the central spring is also accomplished in a similar manner, with the exception that set screws are removed from the bottom of the axle seat assembly and the central spring must be lifted from within the axle seat assembly after the torque arms have been pivoted away through jacking of the vehicle or the like.

There are various changes and modifications which may be made to applicant's invention or would be apparent to those skilled in the art. However, any of these changes or modifications are included in the teaching of applicant's disclosure and he intends that his invention be limited only by the scope of the claims appended hereto.

I claim:

1. A vehicle suspension to support a chassis from at least one axle having an axle seat assembly for mounting the axle to the suspension, parallelogram means for extending between a chassis member and the axle seat assembly to stabilize same, said parallelogram means including a first torque arm, a second torque arm for pivotally connecting to and extending between the axle seat assembly and a chassis member, said torque arms being mounted in opposition to each other, and a central spring means disposed between said torque arms, each of said torque arms having a surface bearing against said central spring so that said spring is compressed thereby to resist axle loading.

2. The suspension of claim 1 wherein said parallelogram means further comprises a radius rod for pivotally connecting to and extending between a chassis member and the axle seat.

3. The suspension of claim 1 wherein the pivotal connection for one of said torque arms comprises a shackle, said shackle being pivotally connected to the torque arm and adapted for pivotal connection to a chassis member.

4. The suspension of claim 1 further comprising means to retain said spring disposed between the torque arms as the axle oscillates with respect to the chassis.

5. The suspension of claim 4 wherein the central spring means comprises a generally cylindrically shaped elastomeric spring.

6. The suspension of claim 5 wherein the spring retaining means comprises a dowel pin mounted to each torque arm and aligned with the approximate center axis of the spring, the spring having means defining a generally cylindrical hole at each end thereof and aligned to receive said dowel pins.

7. The suspension of claim 6 wherein the torque arms pivot away from the spring as the axle moves away from the chassis, and the spring retaining means further comprises means to limit said pivoting movement.

8. The suspension of claim 7 wherein said limiting means comprises at least one removable bolt extending through the axle seat, the end of said bolt positioned to contact one of said torque arms as it pivots away from the spring.

9. The suspension of claim 1 further comprising at least one shock absorber for mounting to and extending between the chassis and the axle seat.

10. The suspension of claim 1 further comprising a forward hanger assembly and a rearward hanger assembly for mounting to and extending downwardly from the chassis, the forward end of the parallelogram means being pivotally mounted to said forward hanger, the rearward end of said second torque arm being pivotally mounted to said rearward hanger.

11. The suspension of claim 1 wherein the axle seat assembly is generally U-shaped to facilitate assembly to the axle, and further comprising means extending between the legs of said U to fix same in position and prevent their deformation during oscillation of the axis.

12. A vehicle suspension for supporting a vehicle chassis from an axle comprising an axle seat assembly for mounting to the axle, a forward hanger assembly and a rearward hanger assembly, both of said hanger assemblies being adapted to rigidly mount to and extend downwardly from the chassis, a first torque arm pivotally mounted to and extending between the forward hanger and the axle seat, a second torque arm pivotally mounted to and extending between the rearward hanger and the axle seat, a spring means disposed between said torque arms, each of said torque arms having a surface bearing against said spring so that the torque arms compress the spring as the axle is loaded, and a radius rod pivotally connected to and extending between the forward hanger and the axle seat.

13. The suspension of claim 12 further comprising dowel pins mounted to each torque arm, the spring means having means defining generally cylindrically shaped holes for receiving said dowel pins, said spring being thereby retained between said torque arms.

14. The suspension of claim 13 wherein the axle is a drive axle for a heavy duty vehicle, the axle seat being generally U-shaped to facilitate mounting to the axle, and further comprising tension rails mounted to and extending between the legs of said U-shaped axle seat to prevent separation thereof under load.

15. The suspension of claim 14 wherein the U-shaped axle seat is inverted over the axle, the spring being a generally cylindrically shaped elastomer and centrally positioned beneath the axle, the pivotal connections for the torque arms to the axle seat being positioned above the spring so that as the axle moves away from the chassis the torque arms pivot apart to release the central spring therefrom.

16. The suspension of claim 15 wherein bolts secure the tension rails to the axle seat, said bolts having means to contact the torque arms to limit the pivoting movement of same to prevent release of the central spring.

17. The suspension of claim 16 wherein the pivotal connection between the second torque arm and the rear hanger includes a shackle, said shackle being pivotally connected to and extending between said second torque arm and rear hanger.

18. The suspension of claim 17 further comprising a shock absorber extending between the chassis and the axle seat.

19. The suspension of claim 13 wherein the axle is a steer axle for a heavy duty vehicle, the axle seat adapted to bolt to the top of said steer axle, and the spring being disposed above the axle.

20. The suspension of claim 19 wherein the spring is a generally cylindrically shaped elastomer, the pivotal connections for the torque arms to the axle seat being positioned above the spring so that as the axle moves away from the chassis, the torque arms pivot apart to release the central spring therefrom.

21. The suspension of claim 20 further comprising a set screw removably threaded into the axle seat to contact a torque arm to limit pivoting movement of same to prevent release of the central spring.

22. The suspension of claim 21 wherein the pivotal connection between the second torque arm and the rear hanger includes a shackle, said shackle being pivotally connected to and extending between said second torque arm and rear hanger.

23. The suspension of claim 22 further comprising a shock absorber for extending between the chassis and the axle seat.

24. The suspension of claim 23 wherein the radius rod is offset inwardly from the first torque arm.

* * * * *